United States Patent [19]

Angarola et al.

[11] 4,073,389
[45] Feb. 14, 1978

[54] DUNNAGE BAG FILL VALVE DEVICE WITH INTEGRAL COMBINATION BAFFLE, PLUG-RETAINER, AND BLADDER SEPARATOR

[75] Inventors: Barry R. Angarola, Schaumburg, Ill.; James A. Robbins, Covington, Tenn.

[73] Assignee: Signode Corporation, Glenview, Ill.

[21] Appl. No.: 740,951

[22] Filed: Nov. 11, 1976

[51] Int. Cl.$^2$ .............................................. B60P 7/14
[52] U.S. Cl. .............................. 214/10.5 D; 105/468; 137/223; 280/742
[58] Field of Search ................. 214/10.5 D; 105/468; 137/223, 232; 9/2 A, 11 A, 321, 322; 280/742; 114/54

[56] References Cited

U.S. PATENT DOCUMENTS

| | | | |
|---|---|---|---|
| 3,960,281 | 6/1976 | Reeves | 105/468 X |
| 4,015,622 | 4/1977 | Pagani | 137/223 |

*Primary Examiner*—Lawrence J. Oresky
*Assistant Examiner*—George F. Abraham

*Attorney, Agent, or Firm*—Dressler, Goldsmith, Clement, Gordon & Shore, Ltd.

[57] ABSTRACT

An inflatable dunnage bag having a relatively thin-film, flexible, gastight bladder is provided with a fill valve device extending from the exterior of the bag to the interior of the bladder. The fill valve device includes a hollow housing which is mounted on one end by means of a flange to the outer surface of one wall of the bladder. Within the housing there is an orifice and a plug member which is spring-biased in sealing engagement against the orifice. The plug member extends beyond the end of the housing and into the bladder. A flange on the end of the plug member in the bladder is substantially parallel to, and spaced away from, the mounting flange/bladder wall interface to provide a separation of the bladder walls, to deflect the filling gas to prevent impingement upon the bladder wall opposite the housing, and to provide an anti-blowout stop thereby preventing the plug member from being blown out of engagement with the valve housing when the bag is subjected to high compressive loads.

11 Claims, 4 Drawing Figures

U.S. Patent  Feb. 14, 1978  4,073,389
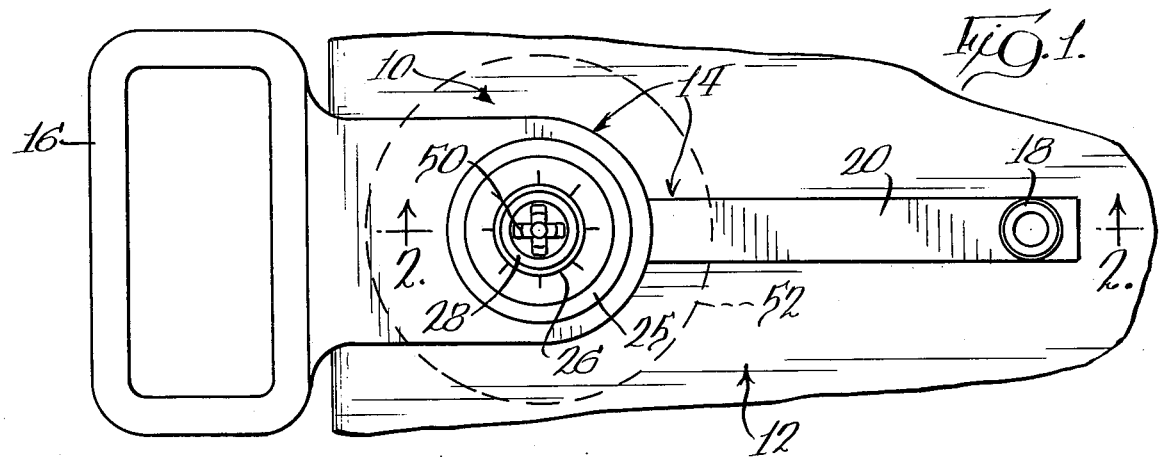
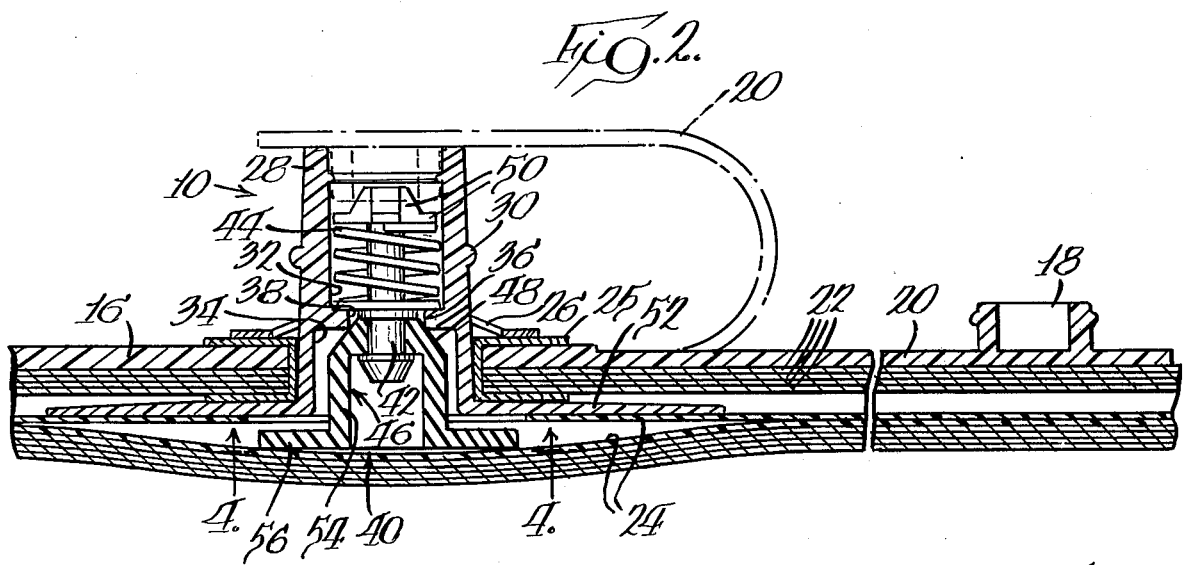
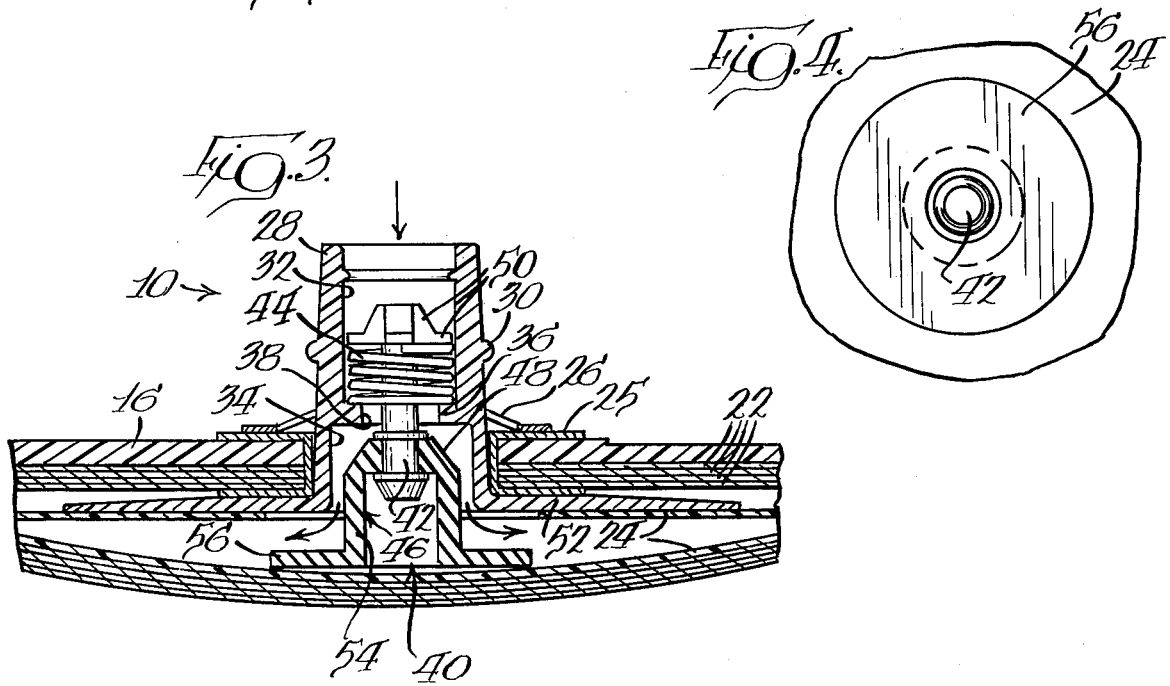

DUNNAGE BAG FILL VALVE DEVICE WITH INTEGRAL COMBINATION BAFFLE, PLUG-RETAINER, AND BLADDER SEPARATOR

BACKGROUND OF THE INVENTION

This invention relates to dunnage for use in shipment of freight by rail, ship, truck, aircraft, and the like, and more particularly, to an inflatable, disposable dunnage bag for such use. Typically, such dunnage bags have a gastight bladder (usually polyethylene) surrounded by an outer protective and supportive shroud consisting of a number of plies of heavy paper.

The inflatable, disposable dunnage bags are used in freight carriers where it is customary to fill the spaces between the cargo or between the cargo and walls of the freight carrier to prevent the cargo from shifting and damaging either the cargo itself and/or the walls of the freight carrier. Inflatable disposable dunnage bags are placed between the cargo in a deflated condition and are subsequently inflated with high pressure air to a certain design pressure, usually between one and eight pounds per square inch, depending on the size and wall structure of the particular bag.

Experience with this type of dunnage bag has revealed certain difficulties during inflation. First, the bags are normally inflated with high pressure air nozzles through a valve in the side of the bag. When the bag is placed up against or between cargo, the air nozzle, when placed over the bag valve and pressed thereagainst, forces the valve into the wall of the bag opposite the valve and against the cargo. This tends to block the discharge area of the valve inside the dunnage bag and tends to prevent the high pressure air from flowing through the valve and into the bag. Consequently, a person who is filling such a dunnage bag under these circumstances must take extra care and extra time to pull the bag valve away from the back wall of the dunnage bag as the bag is being inflated.

Secondly, it has been found that as pressurized air is introduced through the valve, a portion of the wall of the bladder opposite the valve is subjected to a high pressure jet of inrushing pressurized air. This can cause a vibration of the bladder wall opposite the valve which seriously strains and weakens the bladder wall and sometimes causes the bladder wall to fail or rupture.

Third, when dunnage bags of this type are used in freight carriers subjected to high impact loading conditions (such as in railroad cars when the cars are being "bumped"), the plug member inside the valve can be blown out of engagement with the valve housing during peak pressure transients generated within the bag by the impact.

Attempts have been made to solve some of the above described problems. For example, many dunnage bags today are provided with handles near the valve so that the valve can be pulled away from the opposite wall of the dunnage bag during filling to allow the air to pass through the valve and into the bag. Nevertheless, this requires that the person filling the dunnage bag grasp the handle and pull the valve outwardly away from the opposite wall of the bag. Further, in many situations, there is not enough room between the cargo to allow the valve to be pulled sufficiently far away from the other wall of the bag.

There have been many attempts to solve the problem of bladder rupture during inflation of the dunnage bag with high pressure. Examples of such attempts are the structures disclosed and claimed in the U.S. Pat. to Feldkamp, No. 3,414,140; Shaw, No. 3,808,981; Baxter, No., 3,868,026; Reeves, No. 3,944,084; and Reeves, No. 3,960,281. Though some of these attempts may have succeeded in eliminating the bladder rupture problem, all of the attempts nevertheless increase the complexity and costs of the bag by requiring additional members, structures, housings or material to be incorporated in the dunnage bag. Further, these attempts do not address the other two problems.

It would be desirable to provide a dunnage bag having a simple and inexpensive design which, through one simple mechanism, solves the above described three problems.

SUMMARY OF THE INVENTION

In the instant invention, a dunnage bag is provided with an exterior shroud made from a multiple of paper plies (e.g., 2, 4 or 6 plies). Within the shroud is a gastight, film-like, flexible bladder, most preferably polyethylene. A fill valve device is attached to the dunnage bag and penetrates the wall of the shroud and the bladder. In the preferred embodiment, the fill valve device has a generally cylindrical housing with a mounting flange on one end which is heat sealed to the outer surface of the bladder. To permit gas to fill the bladder, a gas passageway is provided inside the housing and communicates from the exterior of the dunnage bag to the interior of the bladder. An annular shoulder inside the housing defines a circular orifice through which the filling gas or air must pass. Disposed within the housing is a plug member having a frustoconical seating surface and which is spring-biased to seal against the orifice and maintain gas within the inflated bag. During inflation of the dunnage, the high pressure filling nozzle is inserted into the external portion of the housing and the plug member is depressed against the biasing spring to move the frustoconical seating surface out of engagement and away from the orifice to allow the high pressure air to flow therethrough.

The plug member extends beyond the mounting flange end of the housing and into the bladder. On the end of the plug member is an annular flange which is substantially parallel to, and spaced from, the mounting flange and which overlaps an annular portion of the mounting flange. The end flange on the end of the plug member operates to separate the wall of the bladder opposite the valve housing from the wall of the bladder to which the housing is mounted. This prevents the bladder wall opposite the housing from blocking the flow path and allows the filling gas to discharge therefrom. The end flange also provides a baffle which deflects the high pressure air stream and redirects the stream as it exits from the valve housing to prevent the air from impinging upon, and possibly damaging, the bladder wall opposite the valve. Once the dunnage bag has been properly disposed between cargo items, and is inflated, the end flange acts as an anti-blowout stop preventing the plug member from being blown out of engagement with the valve housing when the bag is subjected to high compressive loads.

Numerous other advantages and features of the present invention will become readily apparent from the following detailed description of the invention and of one embodiment thereof, from the claims and from the accompanying drawings in which each and every detail shown is fully and completely disclosed as a part of this specification.

BRIEF DESCRIPTION OF THE DRAWINGS

In the accompanying drawings forming part of the specification, and in which like numerals are employed to designate like parts throughout the same, FIG. 1 is a partial plan view of a portion of a dunnage bag of the preferred embodiment of this invention showing the fill valve device, cap, and bag handle;

FIG. 2 is an enlarged cross-sectional view taken generally along the plane 2—2 of FIG. 1;

FIG. 3 is a view similar to FIG. 2 but showing the valve device in an open position to allow the flow of high pressure air therethrough; and FIG. 4 is a partial plan view of the bottom of the fill valve device of the present invention taken generally along the plane 4—4 of FIG. 2.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

For ease of description, the apparatus of this invention will be described in normal operating position, and terms such as upper, lower, horizontal, etc., will be used with reference to this normal operating position. It will be understood, however, that apparatus of this invention may be manufactured, stored, transported and sold in orientation other than the normal operation position described.

Referring now to FIG. 1, there is illustrated a fill valve device 10 of the present invention which is provided in a portion of the upper wall 12 of a dunnage bag. Disposed on the top surface of the upper wall 12 and adjacent the fill valve device 10 is an integral handle and cap structure 14. On one side of the fill valve device 10 is a handle 16 which can be used for carrying the dunnage bag and locating the dunnage bag between cargo articles. On the other side is a cap 18 which can be secured to the fill valve device 10 after the dunnage bag has been inflated as shown by the dashed lines in FIG. 2. The cap is retained with the dunnage bag when not in use and when disengaged from the fill valve device by means of flexible arm 20. The integral handle and cap structure 14 can be made out of many suitable materials but is preferably polyethylene.

FIG. 2 shows the fill valve device 10 mounted in the upper wall of the dunnage bag and penetrating therethrough. Four plies of Kraft paper 22 form an outer shroud around a thin polyethylene bladder 24 (4 to 6 mils thick). A hole through which the fill valve device 10 is inserted in the upper wall 12 is defined by a grommet 25 which is clamped around the integral handle and cap structure 14 and the Kraft paper plies 22. A lock washer 26 is provided to hold the upper wall 12 in place around the fill valve device 10.

The fill device 10 has a substantially cylindrical hollow housing 28 with a circumferential exterior reinforcing rib 30 to retain lock washer 26. Within housing 28 is an upper interior cylindrical surface 32 and a lower interior cylindrical surface 34 which are separated by an annular shoulder 36 projecting outwardly from the upper and lower interior cylindrical surfaces. The annular shoulder 36 presents a circular orifice 38 through which the filling gas or air must pass.

Disposed within the housing 28 and passing through the orifice 38 is a valve member 40. Valve member 40 comprises a stem 42, a bias spring 44 and a plug member 46 having a frustoconical seating surface 48. A cruciform structure 50 which retains spring 44 is provided on the upper end of the stem 40 and is forced upwardly by the compressed bias spring 44 acting between the annular shoulder 36 and the cruciform structure 50. In the normally closed position, bias spring 44 thus urges the frustoconical seating surface 48 into sealing engagement with orifice 38 to prevent the flow of air out of the bladder 24.

One end of the housing 28 projects through the dunnage bag plies 22 and has thereon an annular mounting flange 52 which projects outwardly below the plies and above the upper wall of the bladder 24. The underside of the mounting flange 52 is secured to the outer surface of the upper wall of the bladder 24, as by a heat seal or other suitable method.

To provide support for the novel bladder separator of the invention, the valve member 40 projects beyond the end of housing 28 and into the interior of bladder 24. Specifically, a hollow cylindrical extension member 54 is disposed near one end of stem 42 concentric with the longitudinal axis of the cylindrical housing 28. An annular end flange 56 is provided on the distal end of the extension member 54. The end flange 56 projects radially from extension member 54 substantially parallel to the underside of mounting flange 52 and overlaps a portion of mounting flange 52. To provide separation of the walls of bladder 24, the end flange 56 is spaced from the mounting flange 52 when the valve member 40 is in the closed position.

During inflation, an air fill gun or nozzle device is inserted into the upper end of the housing 28 and against structure 50 to force the stem 42 against spring 44 to move the frustoconical seating surface 48 away from orifice 38 to allow passage or air therethrough. Though the filling gun or nozzle is not illustrated in FIG. 3, the position assumed by the valve member 40 during the filling process is shown in FIG. 3. It can be seen in FIG. 3 that the air stream flowing through the orifice 38 flows around and over the frustoconical seating orifice 48 and down between the exterior of the cylindrical extension member 54 and the lower interior cylindrical surface 34 of housing 28. The air stream (shown by arrows) is deflected by the upper surface of end flange 56 at a substantially right angle and is redirected parallel to the bottom surface of the mounting flange 52. In this manner, end flange 56 functions as a baffle cross wall. Thus, impingement of the high pressure air stream upon the bladder wall opposite the housing is prevented, thereby precluding rupture of the bladder wall.

During the bag inflation process, the hollow cylindrical extension member 54 and the end flange 56 also push against the wall of the bladder 24 opposite the housing 28 to provide a separation of the bladder walls so that the air stream can flow therebetween and inflate the bladder. If the dunnage bag is being held tight up against the cargo article, the end flange 56 and extension member 54 push against the bladder wall opposite the housing 28 and provide relative displacement between the bladder wall and the housing to prevent blockage of the air flow.

Once the bag has been inflated and the air nozzle removed from the housing 28, bias spring 44 urges the stem 42 and plug member 46 upwardly so that the frustoconical seating surface 48 is brought into sealing engagement with the orifice 38. The cap 18 may or may not be secured to the housing 28 as illustrated by dashed lines in FIG. 2. When in place, cap 18 provides a secondary seal and further provides protection for the valve member 40 inside housing 28.

When the fill valve device 10 of the present invention is used in dunnage bags which are subjected to high impact loading (as would be encountered in railroad cars when they are being "bumped"), any tendency of the plug member 46 to be blown outwardly against or through orifice 38 is effectively prevented by the unique structure of the integral end flange 56. When a peak pressure transient is generated within the bag from an external cargo impact, the pressure wave cannot force plug member 45 out of engagement with housing 28 because end flange 56 is forced against the bottom surface of mounting flange 52 to prevent further outward (upward as viewed in FIG. 2) movement of the plug member.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In an inflatable dunnage bag having a relatively thin-film, flexible, airtight bladder, the improvement comprising:

a fill valve device mounted in said bag and extending from the exterior of the bag to the interior of said bladder, said bladder being inflatable with a gas through the fill valve device, said fill valve device having a hollow housing and a plug member disposed therein, said housing having on one end a mounting flange secured to said bladder, the interior surface of said housing defining an orifice, said plug member having a seating surface adapted to seal against said orifice, said plug member further having an extension member projecting from said one end of said housing into said bladder beyond said mounting flange, said extension member having on the distal end a baffle cross wall spaced from, and partially overlapping, said mounting flange whereby, when said bag is being inflated, said baffle cross wall deflects the gas to prevent impingement upon the bladder wall opposite said one end of said housing.

2. The improvement in accordance with claim 1 in which said housing is substantially cylindrical and said mounting flange is annular.

3. The improvement in accordance with claim 2 further including an annular shoulder on the interior surface of said housing presenting a circular aperture defining said orifice.

4. The improvement in accordance with claim 1 in which said mounting flange is secured to the outer surface of said bladder.

5. The improvement in accordance with claim 1 in which said extension member is a hollow cylinder.

6. The improvement in accordance with claim 5 in which said baffle cross wall is an annular flange substantially parallel to said mounting flange.

7. In an inflatable dunnage bag having a relatively thin-film, flexible, airtight bladder, the improvement comprising:

a fill valve device mounted in said bag and extending from the exterior of the bag to the interior of said bladder, said bladder being inflatable with a gas through the fill valve device, said fill valve device having a hollow housing defining an orifice therein and further having a valve member adapted to seal against said orifice, said housing having on one end a mounting flange secured to said bladder, said valve member projecting into said bladder beyond said mounting flange on said one end of said housing when the dunnage bag is deflated and being movable during the inflation of said bag further into said bladder to open said orifice and allow the gas to pass therethrough whereby said valve member forces the bladder wall opposite the valve device outwardly from said one end of said housing to prevent blockage of the gas flow discharging therefrom.

8. The improvement in accordance with claim 7 in which said valve member includes a plug member having a frustoconical seating surface and a spring means for biasing said plug member to seal against said orifice.

9. The improvement in accordance with claim 7 in which the projecting portion of said valve member constitutes a hollow cylinder projecting into said bladder beyond said mounting flange.

10. In an inflatable dunnage bag for use in absorbing high impact loads, the improvement comprising:

a fill valve device mounted in said bag and extending from the exterior of the bag to the interior of said bag, said bag being inflatable with a gas through the fill valve device, said fill valve device having a hollow housing and a plug member disposed therein, said housing having on one end a mounting flange secured to an interior portion of said bag, the interior surface of said housing defining an orifice, said plug member having a seating surface adapted to seal against said orifice, said plug member further having an extension member projecting from said one end of said housing beyond said mounting flange, said extension member having on the distal end a cross member extending beyond the interior surface of said housing and overlapping portions of said mounting flange whereby, when the bag is subjected to high compressive loads, said cross member is forced against said portions of said mounting flange to provide an anti-blowout stop thereby preventing said plug member from being blown out of engagement with said valve housing.

11. In an inflatable dunnage bag having a relatively thin-film, flexible, airtight bladder, the improvement comprising:

a fill valve device mounted in said bag and extending from the exterior of the bag to the interior of said bladder, said bladder being inflatable with a gas through the fill valve device, said fill valve device having a hollow housing defining an orifice therein and further having a valve member adapted to seal against said orifice, said housing having on one end a mounting flange secured to said bladder, said valve member projecting beyond said mounting flange and having an end flange spaced from, and substantially parallel to, said mounting flange, said end flange extending beyond the interior surface of said housing to overlap a portion of said mounting flange, said valve member being moveable during the inflation of said dunnage bag to open said orifice and allow the gas to pass therethrough whereby said end flange (1) forces the bladder wall opposite the valve outwardly from said one end of said housing to prevent blockage of the gas, (2) baffles said gas to prevent impingement upon the bladder wall opposite said one end of said housing and (3) provides an anti-blowout stop to retain said plug member in said valve device when the inflated bag is subjected to high compressive loads.

* * * * *